(12) United States Patent
Situ et al.

(10) Patent No.: US 9,668,093 B2
(45) Date of Patent: May 30, 2017

(54) GROUP POSITIONING METHOD AND SYSTEM

(71) Applicant: TENCENT TECHNOLOGY (SHENZHEN) COMPANY LIMITED, Shenzhen (CN)

(72) Inventors: Zhiyuan Situ, Shenzhen (CN); Jianxing Yu, Shenzhen (CN); Lingling Yi, Shenzhen (CN); Peng He, Shenzhen (CN); Tao Wen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/105,715

(22) PCT Filed: Apr. 21, 2015

(86) PCT No.: PCT/CN2015/077083
§ 371 (c)(1),
(2) Date: Jun. 17, 2016

(87) PCT Pub. No.: WO2015/161783
PCT Pub. Date: Oct. 29, 2015

(65) Prior Publication Data
US 2016/0316323 A1    Oct. 27, 2016

(30) Foreign Application Priority Data

Apr. 22, 2014   (CN) .......................... 2014 1 0163563

(51) Int. Cl.
*H04W 4/02* (2009.01)
*H04W 4/08* (2009.01)
*H04W 64/00* (2009.01)

(52) U.S. Cl.
CPC ............... *H04W 4/02* (2013.01); *H04W 4/08* (2013.01); *H04W 64/006* (2013.01)

(58) Field of Classification Search
USPC ...... 455/507, 456.1–457, 518, 519; 707/737, 707/722, 769
See application file for complete search history.

(56) References Cited

U.S. PATENT DOCUMENTS

| 9,020,534 B2 | 4/2015 | Ruuspakka et al. | |
| 2010/0279708 A1* | 11/2010 | Lidsrom | H04W 4/02 455/456.1 |

(Continued)

FOREIGN PATENT DOCUMENTS

| CN | 101604320 A | 12/2009 |
| CN | 101957834 A | 1/2011 |

(Continued)

OTHER PUBLICATIONS

International Search Report and Written Opinion, International Application No. PCT/CN2015/077083, mailed Jul. 29, 2015.

(Continued)

*Primary Examiner* — Kamran Afshar
*Assistant Examiner* — Farideh Madani
(74) *Attorney, Agent, or Firm* — Marshall, Gerstein & Borun LLP

(57) ABSTRACT

The present disclosure provides a group positioning method; the method includes: acquiring position information corresponding to positioned user identifiers in a group, to obtain a position information set; and determining a group central position according to the position information set, the number of geographical distance values that are less than or equal to a preset distance threshold among geographical distance values between the group central position and geographical positions represented by position information (Continued)

102
Acquire position information corresponding to positioned user identifiers in a group, to obtain a position information set 104
Determine a group central position according to the position information set, the number of geographical distance values that are less than or equal to a preset distance threshold among geographical distance values between the group central position and geographical positions represented by position information in the position information set being maximized in the position information set being maximized. With the group positioning method provided by the present disclosure, the number of group members carrying out activities in a circular area that uses the group central position as the center and the preset distance threshold as the radius is maximized.

12 Claims, 8 Drawing Sheets

(56) References Cited

U.S. PATENT DOCUMENTS

| | | | |
|---|---|---|---|
| 2011/0167079 A1* | 7/2011 | Haridasan | G06Q 30/00 707/769 |
| 2011/0177832 A1 | 7/2011 | Huang | |
| 2014/0280053 A1* | 9/2014 | Derks | G06Q 10/10 707/722 |

FOREIGN PATENT DOCUMENTS

| | | | |
|---|---|---|---|
| CN | 102845081 A | | 12/2012 |
| CN | 103426130 A | | 12/2013 |
| CN | 103684993 A | * | 3/2014 |
| CN | 103684993 A | | 3/2014 |
| CN | 103686617 A | * | 3/2014 |
| CN | 103686617 A | | 3/2014 |

OTHER PUBLICATIONS

Office Action in CN Application No. 201410163563.2 dated Nov. 9, 2016, 7 pages.

Extended European Search Report in EP Application No. 15783932.5 dated Mar. 2, 2017, 8 pages.

\* cited by examiner

GROUP POSITIONING METHOD AND SYSTEM

CROSS-REFERENCE TO RELATED APPLICATION

This application is a national phase of International Application PCT/CN2015/077083 filed on Apr. 21, 2015, which claims benefit of and priority to Chinese Patent Application No. 201410163563.2 filed on Apr. 22, 2014 entitled "Group Positioning Method and System". The entire disclosures of each of the above applications are incorporated herein by reference.

FIELD OF THE TECHNOLOGY

The present disclosure relates to the field of Internet technologies, and in particular, to a group positioning method and system.

BACKGROUND OF THE DISCLOSURE

With the development of Internet technologies, a large number of people communicate and keep in contact with each other through networks, leading to the rapid development of network-based instant messaging products. Users of instant messaging products can not only communicate with each other one on one, but also create an instant messaging group to carry out communication involving more users.

Some instant messaging groups reflect a certain entity relationship among group members, and in one type of entity-relationship-based instant messaging groups, such as a colleague group and a neighbor group, group members in the instant messaging group gather in a certain area. If the position of such group can be determined, various useful information can be provided for group members according to the position of the group, to facilitate work and life of people. For example, other groups or users near the group may be recommended to the group members according to the position of the group, or information about restaurants, hotels, and the like near the group may be provided for the group members according to the position of the group.

Current instant messaging group positioning methods mainly include: a positioning method based on a position manually completed by a user, a positioning method based on a position of a group administrator, and a positioning method based on filtering according to a group name keyword. The positioning method based on a position manually completed by a user requires a user to complete geographical position information of the group manually; however, whether the user completes the geographical position information or not is of the user's own free will, and moreover, it is hard to measure the correctness of the group position information reported by the user. In the positioning method based on a position of a group administrator, the group position is determined solely on the position of the group administrator, and the position of the group administrator is approximately regarded as the position of the group; however, as a matter of fact, the position of the group administrator cannot truly reflect the position of the group. The positioning method based on filtering according to a group name keyword relies on the correctness of the group name keyword completed by the group administrator, for example, the name of a university, city, or place of work, and it is hard to measure the correctness of the keyword completed by the user. Therefore, positioning effects of the conventional instant messaging group positioning methods are unsatisfactory; the conventional instant messaging group positioning methods usually cannot reflect the actual geographical position of the group, and need to be improved.

SUMMARY

Accordingly, it is necessary to provide a group positioning method and system to solve the problem that conventional instant messaging group positioning methods cannot reflect an actual geographical position of a group.

A group positioning method includes:

acquiring position information corresponding to positioned user identifiers in a group, to obtain a position information set; and determining a group central position according to the position information set, the number of geographical distance values that are less than or equal to a preset distance threshold among geographical distance values between the group central position and geographical positions represented by position information in the position information set being maximized.

A group positioning system includes:

a position information acquiring module, configured to acquire position information corresponding to positioned user identifiers in a group, to obtain a position information set; and a group central position determining module, configured to determine a group central position according to the position information set, the number of geographical distance values that are less than or equal to a preset distance threshold among geographical distance values between the group central position and geographical positions represented by position information in the position information set being maximized.

In the foregoing group positioning method and system, position information corresponding to positioned user identifiers in a group is acquired first to obtain a position information set, and then a group central position is determined according to the acquired position information set. In addition, the number of geographical distance values that are less than or equal to a preset distance threshold among geographical distance values between the group central position and geographical positions represented by position information in the position information set being maximized represents that the number of group members carrying out activities in a circular area that uses the group central position as the center and the preset distance threshold as the radius is maximized. The group central position determined in this manner can reflect actual geographical positions of as many members as possible in the group, and therefore, the group central position can reflect an actual geographical position of the group.

DESCRIPTION OF EMBODIMENTS

To make the objectives, technical solutions and advantages of the present disclosure clearer, the present disclosure is described in further detail below with reference to the accompanying drawings and embodiments. It should be understood that the specific embodiments described herein are merely for illustrating the present disclosure but not intended to limit the present disclosure.

Figure 1:
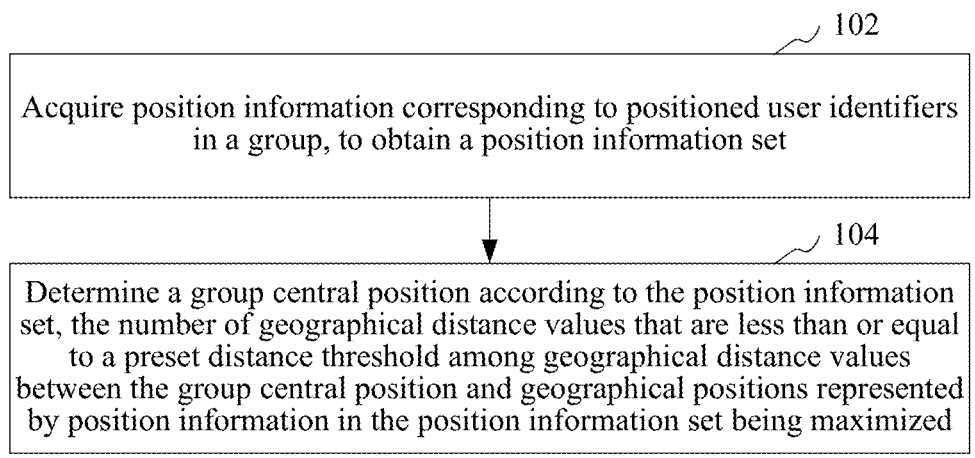
FIG. 1 is a schematic flowchart of a group positioning method in an embodiment.

As shown in FIG. 1, in an embodiment, a group positioning method is provided. The method includes the following steps:

Step 102: Acquire position information corresponding to positioned user identifiers in a group, to obtain a position information set.

A group is a data object that can represent a communication relationship among multiple users, and terminals corresponding to user identifiers in the group may perform one-to-one, many-to-one, and many-to-many communication. A group identifier may be used to associate multiple user identifiers, so as to represent the group. A terminal corresponding to any user identifier in the group can communicate with terminals corresponding to other user identifiers in the group, thereby implementing multi-party communication. The group includes, but is not limited to, an instant messaging group, a group based on a social network, a multi-party voice communication group, a multi-party video communication group, a discussion group established based on an existing group, multi-party session group, and the like.

The positioned user identifier in the group refers to a user identifier which is in the group and corresponding to a terminal of which a geographical position has been determined. The positioned user identifier includes a user identifier of which position information is reported by a terminal capable of reporting positions, and may also include a user identifier of which position information can be predicted according to position information reported by other user identifiers in the group. The position information corresponding to the user identifier refers to information representing a specific geographical position of the terminal corresponding to the user identifier on the earth, for example, the position information may be the longitude and latitude of the terminal corresponding to the user identifier.

The geographical position of the terminal can reflect a geographical position of a user of the terminal, and therefore, the position information corresponding to the user identifier can reflect the geographical position of the user using the user identifier. Because the user is usually active, the user identifier may correspond to multiple pieces of position information.

Step 104: Determine a group central position according to the position information set, the number of geographical distance values that are less than or equal to a preset distance threshold among geographical distance values between the group central position and geographical positions represented by position information in the position information set being maximized.

The group central position is used for representing the geographical position of the group, and the group central position should reflect geographical positions of group members. Therefore, a reasonable group central position should be a center of geographical positions of most members in the group, and cover geographical positions of position information corresponding to as many positioned user identifiers as possible in the group.

It is assumed that positioned user identifiers in a group correspond to a total of n pieces of position information, forming a position information set, where position information of the $i^{th}$ positioned user identifier is $p_i$, $i \in \{1, 2, \ldots, n\}$. The group central position is c. r represents a confidence radius corresponding to the group central position c, namely, the preset distance threshold. In this manner, the problem of determining the group central position becomes an optimization (or sometimes referred to as mathematical programming) problem, and a target function for optimization is:

$$\max \sum_{i=1}^{n} \text{sgn}(r - \text{distance}(p_i, c));$$

where the function distance(,) is a function for solving a geographical distance value, representing solving a geographical distance value between geographical positions represented by two independent variables of the function distance(,); the function sgn( ) is a logic function, representing that if the variable of the function sgn( ) is greater than or equal to 0, the result of the function is 1, and if the variable of the function sgn( ) is not less than 0, the result of the function is 0; the function sgn( ) is used for indicating whether the geographical distance value distance($p_i$,c) between the geographical position represented by the position information $p_i$ in the position information set and the group central position is less than or equal to the preset distance threshold r, and if yes, the result of the function sgn( ) is 1, or if not, the result of the function sgn( ) is 0; to summate result values is to count the number of geographical distance values that are less than or equal to the preset distance threshold r; max indicates that the count is maximized.

Therefore, the foregoing target function means to find a group central position c that satisfies the following condition: in a geographical distance value set formed by geographical distance values distance($p_i$,c) between the group central position c and geographical positions represented by position information $p_i$ in the position information set, the number of geographical distance values distance($p_i$,c) that are less than or equal to the preset distance threshold r is maximized.

The confidence radius or preset distance threshold is a geographical distance determined in advance, in which a probability of people carrying out activities is greater than a preset probability threshold, for example, the preset geographical distance threshold may be 700 meters to 1500 meters, especially, the group positioning effect is optimal when the geographical distance threshold is 1000 meters. Moreover, the position information reported by the terminal generally has an error, and the error may be several hundred meters; therefore, setting the geographical distance threshold to around 1000 meters can avoid the interference of the error.

During calculation of the geographical distance value, the earth may be approximated as a normal sphere, and in this case, the geographical distance between two points can be solved by using a spherical distance formula.

$$\text{distance}(p_i,p_j) = R \cdot \arccos \left[ \cos \beta_i \cos \beta_j \cos(\alpha_i - \alpha_j) + \sin \beta_i \sin \beta_j \right]$$

where $p_i$, $p_j$ represent two points involved in the calculation of the geographical distance respectively; R=6318.137 (kilometers), representing the radius of the earth; $\alpha_i, \beta_i$ represent the longitude and latitude of the point $p_i$ respectively; and $\alpha_j, \beta_j$ represent the longitude and latitude of the point $p_j$ respectively.

An existing mathematical programming algorithm, such as integer programming, may be used to obtain an optimal solution of the target function. Specifically, a value range of the group central position may be determined according to the position information in the position information set, and then the group central position is set to every integer value in the value range, to find, in the value range, an integer value that makes $$\sum_{i=1}^{n} \text{sgn}(r - \text{distance}(p_i, c))$$

maximum, and the integer value is used as the finally determined group central position.

In the foregoing group positioning method, position information corresponding to positioned user identifiers in a group is acquired first to obtain a position information set, and then a group central position is determined according to the acquired position information set. In addition, the number of geographical distance values that are less than or equal to a preset distance threshold among geographical distance values between the group central position and geographical positions represented by position information in the position information set being maximized represents that the number of group members carrying out activities in a circular area that uses the group central position as the center and the preset distance threshold as the radius is maximized. The group central position determined in this manner can reflect actual geographical positions of as many members as possible in the group, and therefore, the group central position can reflect an actual geographical position of the group.

Figure 2:
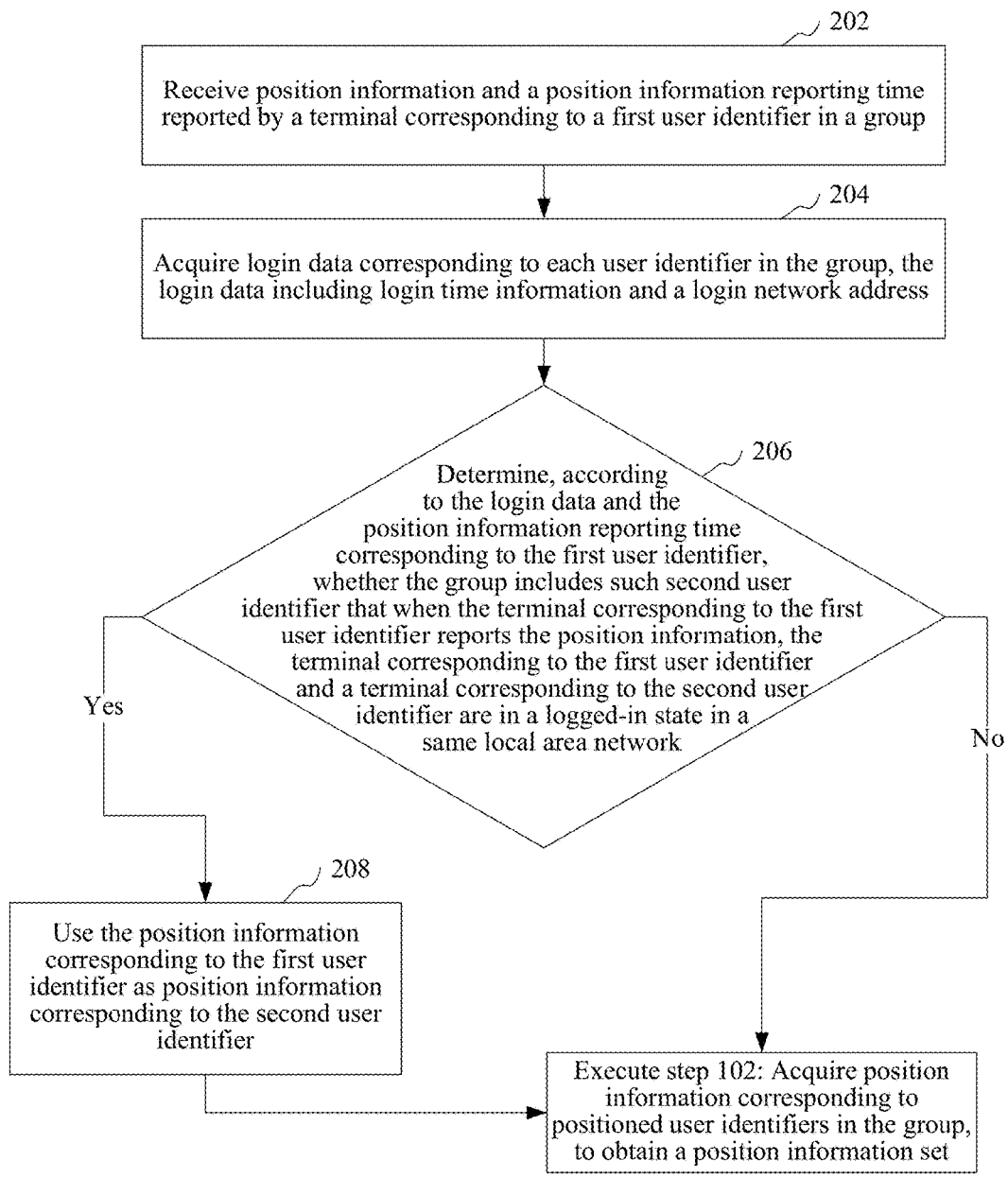
FIG. 2 is a schematic flowchart of a step of position information diffusion in an embodiment.

As shown in FIG. 2, in an embodiment, before step 102, the method further includes a step of position information diffusion, which specifically includes the following steps:

Step 202: Receive position information and a position information reporting time reported by a terminal corresponding to a first user identifier in the group.

The first user identifier is a user identifier corresponding to a terminal that proactively reports position information, and the terminal corresponding to the first user identifier is a terminal capable of reporting positions. The terminal generally may be a mobile terminal, such as a mobile phone, a tablet computer, or a personal digital assistant (PDA). Such mobile terminal generally has a Global Positioning System (GPS) module and a network connection module, and therefore, can implement real-time positioning and report position information and a position information reporting time. The position information reporting time refers to time when the terminal reports the position information.

The terminal corresponding to the first user identifier may report position information by using application clients such as an instant messaging client and an electronic map client running thereon. Specifically, the terminal corresponding to the first user identifier may report location based service (LBS) information, where the LBS includes the first user identifier, the position information reporting time, and the position information. The LBS information may further include a positioning type, such as a GPS positioning type, a Cell-ID positioning type, or a WIFI (where WIFI is a technology for connection to a wireless network by using radio waves) positioning type, where the GPS positioning type is the most accurate, and the credibility of the reported position information may be judged according to the positioning type. The LSB information may further include a login network address corresponding to the first user identifier.

Step 204: Acquire login data corresponding to each user identifier in the group, the login data including login time information and a login network address.

Login data corresponding to all user identifiers in the group may be acquired, and the user identifiers herein include a first user identifier and a second user identifier that is described below. Alternatively, after the first user identifier reports the LBS information including the login time information and login network address thereof, only login data corresponding to user identifiers that are not the first user identifier in the group may be acquired. The login time information may be used to represent a period of time when the corresponding user identifier is in a logged-in state, for example, the login time information may include a specific time point when a login action (or an action of getting online) is executed and a time point when a logout action (which is opposite to the login action, and may be referred to as an action of getting offline) is executed. The login network address is used for indicating a network location of the terminal when the terminal logs in, for example, the login network address may be an Internet Protocol (IP) address.

Step 206: Determine, according to the login data and the position information reporting time corresponding to the first user identifier, whether the group includes such second user identifier that when the terminal corresponding to the first user identifier reports the position information, the terminal corresponding to the first user identifier and a terminal corresponding to the second user identifier are in a logged-in state in a same local area network. When it is determined that the group includes the second user identifier, step 208 is executed, or when it is determined that the group does not include the second user identifier, step 102 is executed directly.

Specifically, both the first user identifier and the second user identifier are user identifiers in the group, the position information reporting time of the first user identifier has a time overlap with the login time information corresponding to the second user identifier, and network positions represented by the login network address corresponding to the first user identifier and the login network address corresponding to the second user identifier indicate that the first user identifier and the second user identifier are in a same local area network. For example, when the login network address is an IP address, if a binary AND operation between a preset subnet mask and the login network address corresponding to the first user identifier and a binary AND operation between the preset subnet mask and the login network address corresponding to the second user identifier have a same result, it indicates that network positions represented by the login network address corresponding to the first user identifier and the login network address corresponding to the second user identifier are in a same local area network.

Step 208: Use the position information corresponding to the first user identifier as position information corresponding to the second user identifier. Step 102 is executed after step 208.

Figure 3:
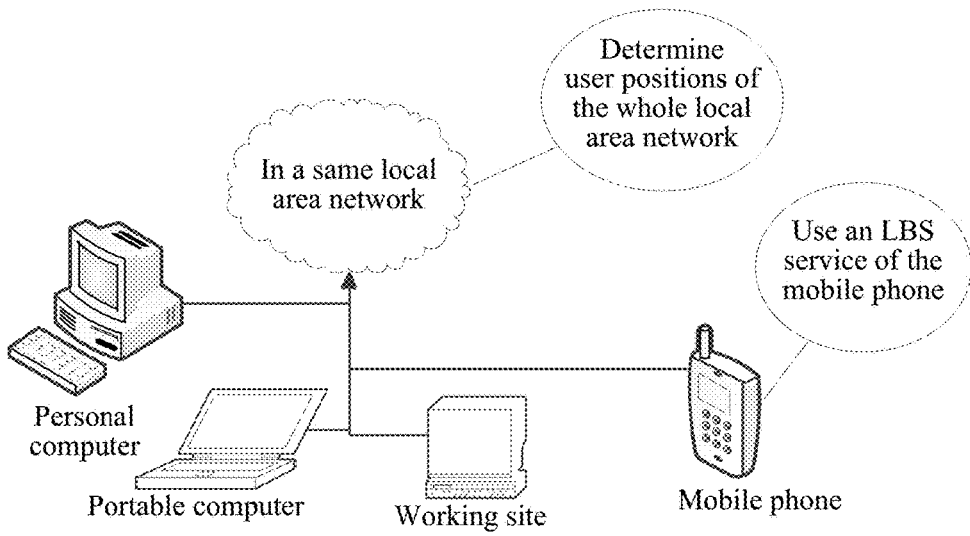
FIG. 3 is a schematic diagram of a principle of using position information corresponding to a first user identifier as position information corresponding to a second user identifier in an embodiment.

If the number of first user identifiers whose position information is reported is excessively small, the group position determined according to the position information of first user identifiers that only account for a small proportion in the group is inaccurate, and cannot reflect the actual geographical position of the group. As shown in FIG. 3, generally, terminals located in a same local area network are also geographically close to each other, and the terminals located in the same local area network may be approximately regarded as having a same geographical position. Therefore, the position information reported by the terminal corresponding to the first user identifier is used as position information of the local area network where the terminal is located, and because the terminal corresponding to the second user identifier is also located in the local area network, the position information of the local area network may be used as the position information corresponding to the second user identifier. To simplify description, step 208 is briefly described as diffusing the position information of the first user identifier to the second user identifier. This embodiment can increase the amount of position information for determining the group central position, so that the finally determined position of the group is more accurate and can reflect the actual geographical position of the group.

In this embodiment, after step 208, step 102 specifically includes: acquiring the position information separately corresponding to the first user identifier and the second user identifier, to obtain the position information set.

Both the first user identifier and the second user identifier are positioned user identifiers in the group, to acquire the position information of the first user identifier and the position information corresponding to the second user identifier is to acquire position information corresponding to the positioned user identifiers in the group, thereby obtaining the position information set including the acquired position information. The LBS information including the position information may be diffused to the second user identifier, so that the second user identifier has corresponding LBS information.

When the group does not include the second user identifier, the positioned user identifiers are the first user identifiers, and step 102 includes: acquiring position information corresponding to the first user identifiers, to obtain the position information set.

In this embodiment, the step of position information diffusion is used to solve the problem that when only a small proportion of members in the group report position information by using terminals, the number of first user identifiers used as samples is excessively small, which affects the accuracy of the group position determined. Specifically, through step 202 to step 208, when the terminal corresponding to the first user identifier reports position information, if the group includes a second user identifier that is in a logged-in state in a same local area network in a same time period as the first user identifier, the position information reported by the terminal corresponding to the first user identifier is used as position information corresponding to the second user identifier, thereby increasing the number of positioned user identifiers in the group. Experiments show that after the step of position information diffusion, the number of positioned user identifiers in the group is increased by 300% compared with the number of positioned user identifiers when the step of position information diffusion is not performed. In this way, in a subsequent process of determining the group central position according to the positioned user identifier, more position information is involved, so that the finally determined group central position is more accurate and can reflect the actual geographical position of the group.

In an embodiment, after step 102, the method further includes: determining whether a proportion of the number of positioned user identifiers in the group to a total number of user identifiers in the group is greater than or equal to a preset proportion threshold. Step 104 is executed if the proportion is greater than the preset proportion threshold; otherwise, the method process is ended.

It is assumed that the group includes a total of Q user identifiers, the number of positioned user identifiers is M (which, for example, may be a total number of the foregoing first user identifiers and second user identifiers), and $\xi$ is used to represent the preset proportion threshold. If $M/Q \geq \xi$, it indicates that the number of positioned user identifiers in the group is sufficient to determine the position of the group, and therefore, step 104 and subsequent steps can be executed. If $M/Q < \xi$, it indicates that the number of positioned user identifiers in the group is insufficient to accurately determine the position of the group, and therefore, the method process is ended directly. The preset proportion threshold may be set according to actual needs, and generally may be set to any value from 40% to 60%, and is preferably 50%.

In this embodiment, by determining whether the proportion of the number of positioned user identifiers in the group to the total number of user identifiers in the group is greater than or equal to the preset proportion threshold, it is determined whether the group position can be accurately determined according to the position information corresponding to the positioned user identifiers; if the group position cannot be accurately determined according to the position information corresponding to the positioned user identifiers, the method process is ended, and other methods may be used to determine the group position, to avoid that the finally determined group position has an excessive error and fails to reflect the actual geographical position of the group.

In an embodiment, step 102 includes: collecting position information corresponding to positioned user identifiers in the group in a preset time period, and determining representative position information corresponding to each positioned user identifier according to the collected position information, so as to obtain a position information set including the representative position information.

The terminal corresponding to the first user identifier in the group reports position information regularly or irregularly when using an LBS-based application. People are usually active, and therefore, one piece of position information reported by the terminal corresponding to the first user identifier may be incapable of reflecting geographical positions that a user usually haunts. For example, when the user is temporarily on a business trip, the position information reported by a mobile phone cannot reflect geographical positions that the user haunts, and this will cause an error in the finally determined group position.

In this embodiment, position information corresponding to a determined user identifier in the group may be collected in a preset time period, where the preset time period may be one to two months, so as to collect sufficient position information samples, so that the collected position information is combined to reflect an actual geographical position of a user corresponding to the user identifier. Each time position information reported by the terminal corresponding to the first user identifier is received, the position information reported each time may be diffused to the second user identifier that is a logged-in state in a same period of time and in a same local area network as the first user identifier. Finally, the representative position information corresponding to each positioned user identifier is determined according to the collected position information, where the representative position information herein refers to position information determined by combining all the collected position information, so that the representative position information can reflect the actual geographical position corresponding to the user identifier.

Figure 4:
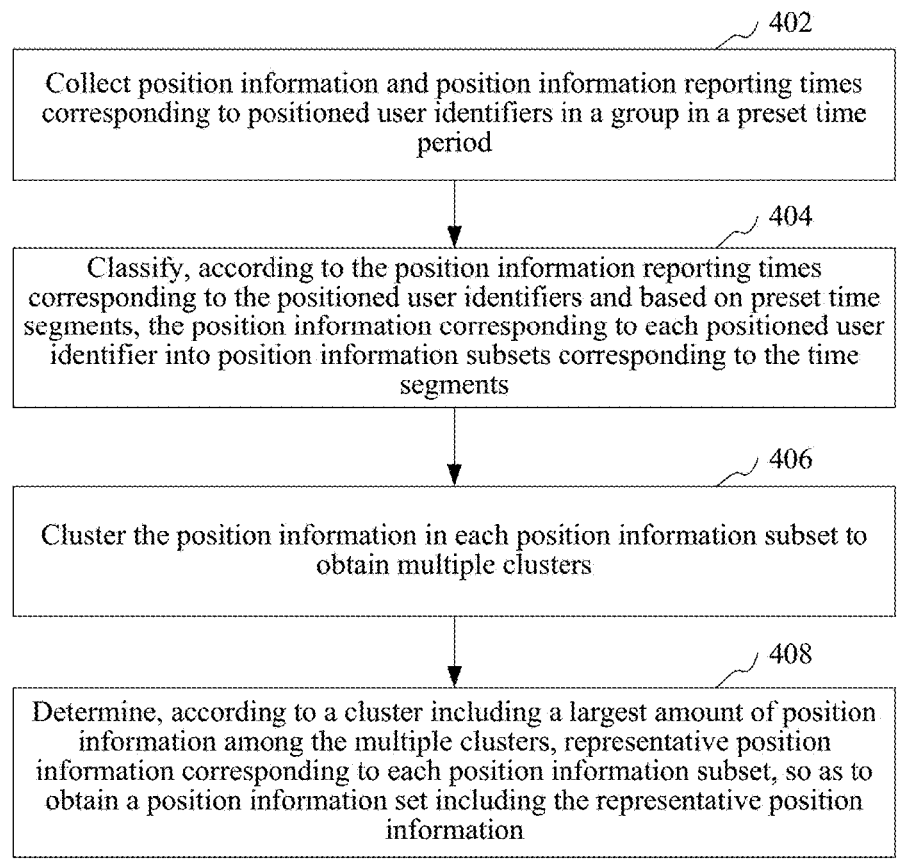
FIG. 4 is a schematic flowchart of a step of collecting position information corresponding to positioned user identifiers in the group in a preset time period, and determining representative position information corresponding to each positioned user identifier according to the collected position information, so as to obtain a position information set including the representative position information in an embodiment.

As shown in FIG. 4, in an embodiment, the step of collecting position information corresponding to positioned user identifiers in the group in a preset time period, and determining representative position information corresponding to each positioned user identifier according to the collected position information, so as to obtain a position information set including the representative position information specifically includes the following steps:

Step 402: Collect position information and position information reporting times corresponding to the positioned user identifiers in the group in a preset time period.

The position information reporting time corresponding to the first user identifier in the group may be from the LBS information reported by the terminal corresponding to the first user identifier. In the foregoing embodiment, the position information and position information reporting time corresponding to the first user identifier may be diffused to the second user identifier, or the LBS information including the position information and the position information reporting time is diffused to the second user identifier, so that the second user identifier has corresponding position information and a corresponding position information reporting time.

Step 404: Classify, according to the position information reporting times corresponding to the positioned user identifiers and based on preset time segments, the position information corresponding to each positioned user identifier into position information subsets corresponding to the time segments.

The time segment refers to a continuous period of time. According to some praxiology researches, most of humans carry out activities in a limited range, and most users usually appear at few places they haunt, for example, a work place of the user and a place where the user lives. Moreover, activity places of humans are closely related to time, for example, the user is generally at the work place in a working time segment from 10 am to 5 pm on a workday, and is generally at the place where the user lives in a home time segment from 8 pm to 6 am of the next day. Therefore, according to the two preset time segments, namely, the working time segment and home time segment, the position information corresponding to each positioned user identifier may be classified into a first position information subset corresponding to the working time segment, and a second position information subset corresponding to the home time segment.

Step 406: Cluster the position information in each position information subset to obtain multiple clusters.

Multiple clustering methods may be used to cluster position information in each position information subset, for example, a system clustering method and a dynamic clustering method. A K-means clustering algorithm is used as an example herein for description. Because most activities of people occur in a limited number of places, in the K-means clustering algorithm herein, K is set to 5, and the K-means clustering algorithm has the following process:

Input: K (K=5), where a first position information subset corresponding to a working time segment corresponding to a given user identifier is lbs [n];

(1) selecting K initial central points, for example, $c[0]$=lbs $[0], \ldots c[K-1]$=lbs $[K-1]$;

(2) comparing each value in lbs $[0] \ldots$, lbs $[n]$ with $c[0] \ldots, c[k-1]$, and if a value has a minimum difference with $c[i]$, marking the point as i (i=0, 1, 2, 3, 4);

(3) for all points marked as i, calculating $c[i]$ again, where $c[i]$={sum of lbs $[j]$ marked as i}/the number of points marked as i; (j is the number of values in lbs $[0] \ldots,$ lbs $[n]$ having minimum differences with $c[i]$ in $c[0] \ldots, c[k-1]$);

(4) repeating (2) and (3), until variations of all values of $c[i]$ are less than a given threshold.

In this way, K cluster centers are obtained, and then, a difference between each piece of position information in the working time subset with each cluster center may be calculated, to classify each piece of position information to a class of a cluster center having a minimum difference with the position information, thereby obtaining K clusters. The K-means clustering algorithm may also be used on the position information subset corresponding to the home time segment, to obtain K clusters, and the calculation process is not described herein again.

Step 408: Determine, according to a cluster including a largest amount of position information among the multiple clusters, representative position information corresponding to each position information subset, so as to obtain the position information set including the representative position information.

Specifically, the number of pieces of position information included in each cluster is counted, and a cluster including a largest amount of position information indicates that the user is more probably to appear in the geographical position corresponding to this cluster; therefore, the representative position information corresponding to the subset may be determined according to this cluster. A mean of all position information in the cluster including the largest amount of position information may be calculated, or a center of gravity of a set formed by all position information in the cluster including the largest amount of position information may be solved, thereby obtaining the representative position information corresponding to each position information subset.

In this embodiment, through step 402 to step 408, on the basis of the praxiology, position information corresponding to each positioned user identifier is classified into corresponding position information subsets according to the position information reporting times corresponding to the positioned user identifiers in the group and a preset number of time segments, and clustering is performed on each position information subset, to obtain representative position information corresponding to each position information subset. The representative position information obtained in this manner can more accurately reflect several different geographical positions that the user haunts, so that a more accurate result is obtained when the position of the group is determined according to multiple pieces of representative position information subsequently.

Figure 5:
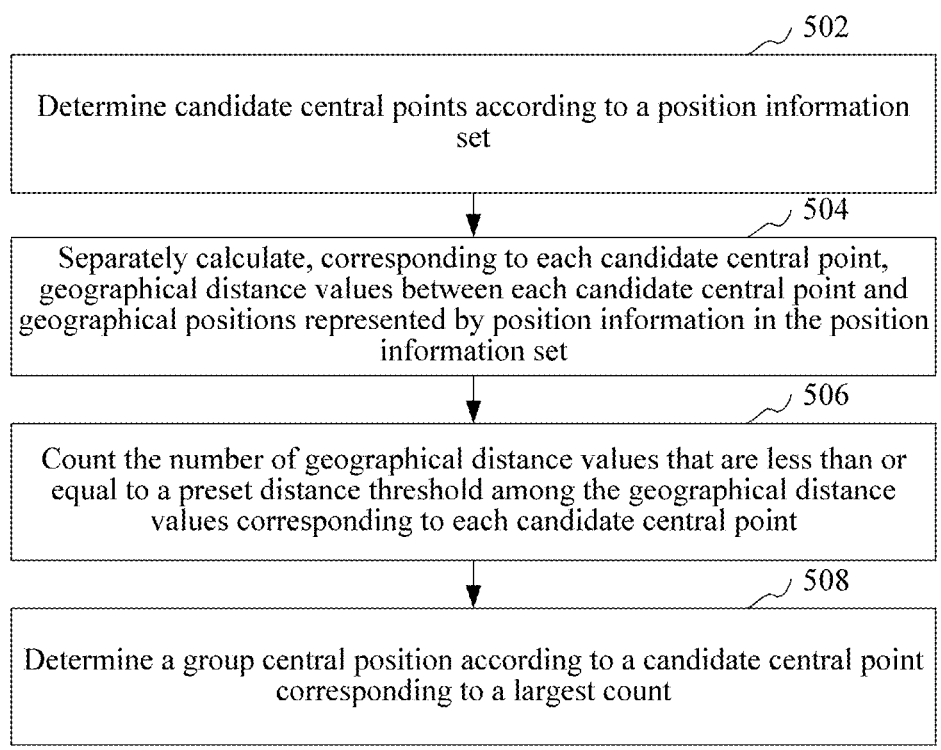
FIG. 5 is a schematic flowchart of a step of determining a group central position according to the position information set in an embodiment.

As shown in FIG. 5, in an embodiment, step 104 specifically includes the following steps:

Step 502: Determine candidate central points according to the position information set.

Specifically, in an embodiment, the geographical position represented by each piece of position information in the position information set is used as a candidate central point. Alternatively, in another embodiment, after cluster subsets are obtained by clustering position information in the position information set, a corresponding candidate central point is determined according to all position information in each cluster subset; for example, a center of gravity or a mean of a set formed by all position information in each cluster subset is calculated.

Step 504: Separately calculate, corresponding to each candidate central point, geographical distance values between each candidate central point and geographical positions represented by position information in the position information set.

For each candidate central point, geographical distance values between the candidate central point and geographical positions represented by position information in the position information set need to be calculated. The geographical distance value may be calculated by using the function distance(,) in the foregoing embodiment, where the candidate central point and each piece of position information in the position information set are separately used as two independent variables of the function distance(,) to calculate the geographical distance value.

In an embodiment, step 502 specifically includes: using a geographical position represented by each piece of position information in the position information set as a candidate central point. In this case, step 504 specifically includes: separately calculating, corresponding to each candidate central point, geographical distance values between each candidate central point and geographical positions represented by position information that is in the position information set and not corresponding to the current candidate central point.

In this embodiment, if the geographical position represented by each piece of position information in the position information set is used as a candidate central point, the position information set has a piece of position information that represents a geographical position the same as the candidate central point, and therefore, for each candidate central point, geographical distance values between the candidate central point and geographical position represented by position information that is in the position information set and not corresponding to the current candidate central point may be calculated. The term "current" refers to time when the geographical distance values corresponding to the candidate central point are calculated.

Step 506: Count the number of geographical distance values that are less than or equal to the preset distance threshold among the geographical distance values corresponding to each candidate central point.

After step 504, a series geographical distance values are calculated for each candidate central point, and then, corresponding to each candidate central point, the number of geographical distance values that are less than or equal to the preset distance threshold among the geographical distance values corresponding to the candidate central point is counted. In this way, each candidate central point corresponds to a count.

Step 508: Determine the group central position according to a candidate central point corresponding to a largest count.

Specifically, because the candidate central point corresponding to the largest count can cover most user identifiers in the group, the candidate central point corresponding to the largest count may be directly used as the group central position.

In this embodiment, through step 502 to step 508 described above, steps for solving the foregoing target function are provided, which have advantages such as a small code amount, high operation efficiency, and low space complexity.

In an embodiment, step 508 specifically includes step 11) to step 12):

Step 11): Select a candidate central point corresponding to a largest count, and determine position information which is in the position information set and of which geographical distance values to the selected candidate central point are less than or equal to the preset distance threshold.

Specifically, after step 506, the count corresponding to each candidate center can be obtained, and then, a candidate central point corresponding to a largest count may be selected. Subsequently, for the selected candidate central point, position information which is in the position information set and represents geographical positions whose geographical distance values to the selected candidate central point are less than or equal to the preset distance threshold is determined. In step 506, statistics about the geographical distance values that are less than or equal to the preset distance threshold among the geographical distance values corresponding to each candidate central point may be collected, and the number of such geographical distance values may be counted, so that the statistics and the number can be directly used in step 11).

Step 12): Calculate a center of gravity of a set formed by the selected candidate central point and the determined position information, to obtain the group central position.

Specifically, geographical positions represented by the selected candidate central point and the determined position information may be connected to form a polygon, a center of gravity of the polygon formed by connecting these points is solved and mapped to the surface of the earth that is approximated as a normal sphere, to obtain the longitude and latitude, thereby obtaining the group central position.

For example, it is set that r=1000, and the set of LBS points is {LBS[0], LBS[1] . . . , LBS[N−1]}; in this case, the set of LBS points includes a total of N LBS points (each LBS point includes position information). Considering step 502 to step 508 and step 11) to step 12) in combination, specific steps for solving the foregoing target function are as follows:

(1) Separately use the N LBS points as candidate central points, for example, $c[0]=LBS[0], \ldots, c[N-1]=LBS[N-1]$.

(2) For each candidate central point among $c[0] \ldots c[N-1]$, substitute the candidate central point and each of LBS [0] . . . LBS [N−1] except the candidate central point itself into the foregoing function distance(,), to obtain a geographical distance value between two points, thereby obtaining N sets, namely, {c[0], (distance [1] . . . distance [N−1]) . . . {c[N−1], (distance [0] . . . distance [N−2])}. The set {c[N−1], (distance [0] . . . distance [N−2])} represents that when c[N−1] is used as the candidate central point, geographical distance values between c[N−1] and points other than c[N−1] in the set of LBS points are distance [0] . . . distance [N−2]) respectively.

(3) Use the foregoing function sgn( ) to filter the N sets obtained in step (2), to obtain points between which the distance is less than r, thereby obtaining {c[0], (distance [1] . . . distance [$k_0$])} . . . {c[n−1], (distance [0] . . . distance [$k_{n-1}$])}.

(4) Find a largest value among $k_0, k_1, \ldots, k_{n-1}$ obtained in step (3), to obtain a set {c[i], (distance [0] . . . distance [$k_1$])}.

(5) The candidate central point c[i] and a total of $k_i+1$ LSB points corresponding to (distance [0] . . . distance [$k_j$]) respectively are obtained after step (4); solve a center of gravity of a set formed by position information of the $k_i+1$ LSB points, to obtain the group central position.

In this embodiment, through step 11) to step 12) described above, after a candidate central point corresponding to a largest count is selected, a center of gravity of all position information in a circular area that uses the selected candidate central point as the center and the preset distance threshold as the radius is solved. Positions of all group members in the area are considered comprehensively, so that the finally obtained group central position can better reflect the actual geographical position of the group.

Figure 6:
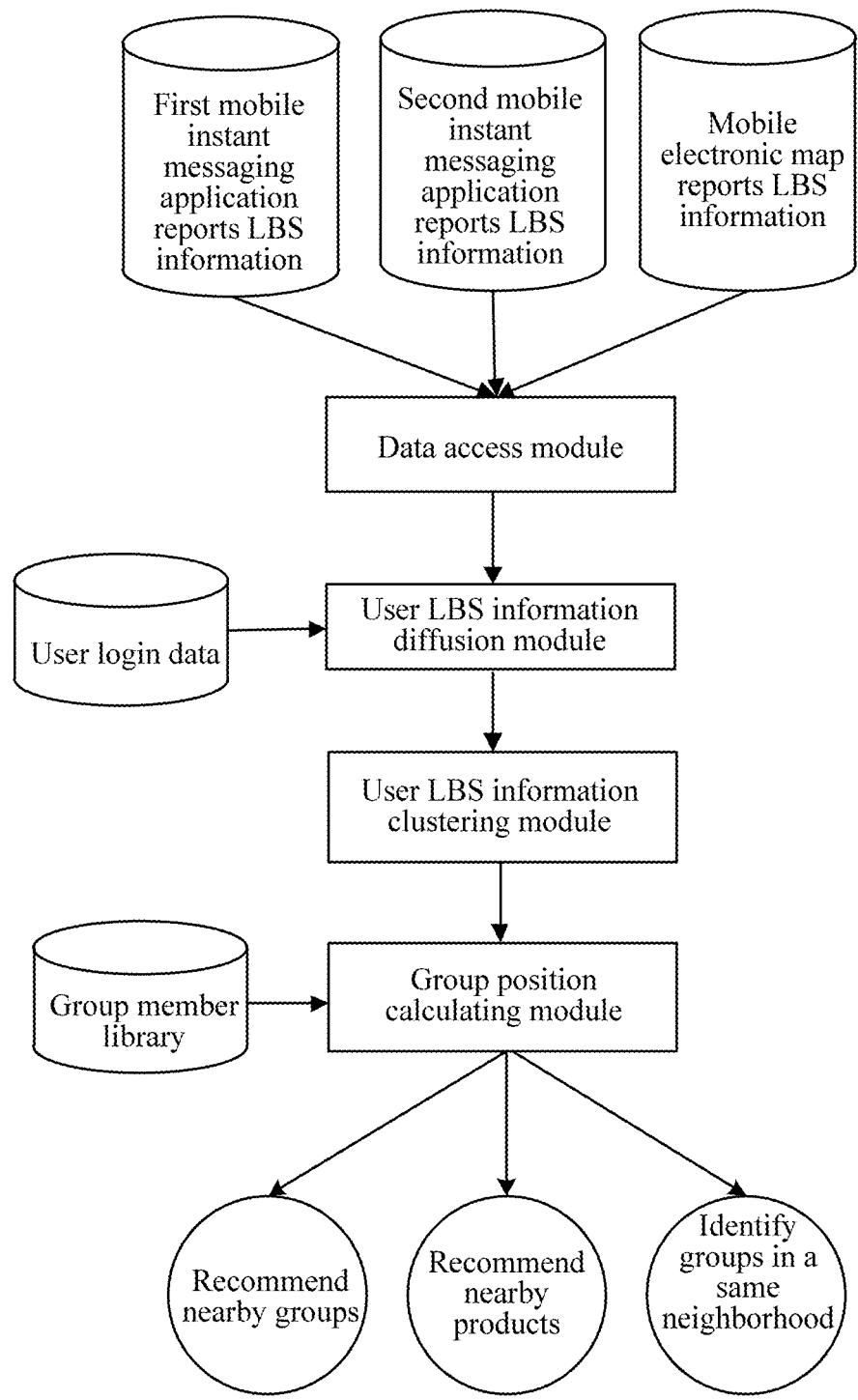
FIG. 6 is a structural block diagram of a group positioning system in an embodiment.

The following describes the principle of the foregoing group positioning method with a specific application scenario; this application scenario is described by using an example in which the group positioning method is applied to a group positioning system. Referring to FIG. 6, the group positioning system includes a data access module, a user LBS information diffusion module, a user LBS information clustering module, and a group position calculating module. The group positioning method specifically includes the following steps:

Instant messaging applications, a mobile electronic map, and the like running on a mobile terminal such as a mobile phone or a tablet computer of a user having a first user identifier regularly or randomly report LBS information of the mobile terminal. The LBS information includes information such as the first user identifier, position information, and a position information reporting time. The data access module is configured to receive the LBS information reported by the mobile terminal corresponding to the first user identifier.

The user LBS information diffusion module is configured to acquire login data corresponding to each user identifier in the group, the login data including login time information and a login network address. The user LBS information diffusion module is configured to determine, according to the login data and the position information reporting time corresponding to the first user identifier, whether the group includes such second user identifier that when the terminal corresponding to the first user identifier reports the position information, the terminal corresponding to the first user identifier and a terminal corresponding to the second user identifier are in a logged-in state in a same local area network. When it is determined that the group includes the second user identifier, the user LBS information diffusion module diffuses the LBS information of the first user identifier to the second user identifier.

The user LBS information clustering module is configured to position information and position information reporting times corresponding to the second user identifier and the first user identifier in the group in a preset time period. According to the position information reporting times corresponding to the positioned user identifiers, position information corresponding to each positioned user identifier is classified into a first position information subset corresponding to a working time segment, and a second position information subset corresponding to a home time segment. The position information in each position information subset is clustered by using a K-means clustering algorithm, to obtain multiple clusters. Finally, a center of gravity of a set formed by all position information in a cluster including a largest amount of position information is solved, thereby obtaining representative position information corresponding to each position information subset; in this way, two pieces of representative position information can be obtained from one positioned user identifier, and finally, a position information set including the representative position information is obtained.

The group position calculating module is configured to determine whether a proportion of the number of the positioned user identifiers in the group to a total number of user identifiers in the group is greater than or equal to a preset proportion threshold. When it is determined that the proportion is greater than the preset proportion threshold, the group position calculating module is configured to use a geographical position represented by each piece of position information in the position information set as a candidate central point; then separately calculate, corresponding to each candidate central point, geographical distance values between each candidate central point and geographical positions represented by position information that is in the position information set and not corresponding to the current candidate central point; count the number of geographical distance values that are less than or equal to the preset distance threshold among the geographical distance values corresponding to each candidate central point; select a candidate central point corresponding to a largest count, and determine position information which is in the position information set and of which geographical distance values to the selected candidate central point are less than or equal to the preset distance threshold; and calculate a center of gravity of a set formed by the selected candidate central point and the determined position information, to obtain the group central position.

Figure 7:
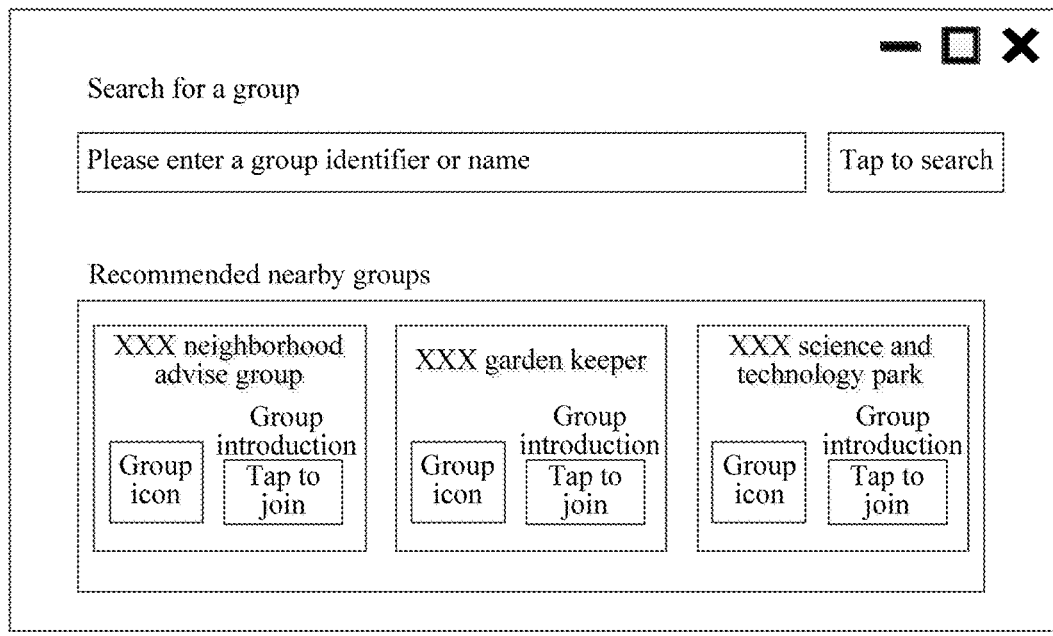
FIG. 7 is a schematic diagram of a user interface for recommending nearby groups on the basis of a group central position in an embodiment.

After the group central position is obtained, other groups or commercial facilities within a preset distance range to the group central position may be recommended to terminals corresponding to user identifiers in the group according to the group central position. Referring to FIG. 7, FIG. 7 shows a user interface for recommending nearby groups on the basis of the group central position.

Figure 8:
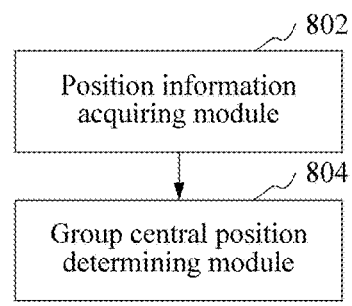
FIG. 8 is a structural block diagram of a group positioning system in another embodiment.

As shown in FIG. 8, in an embodiment, a group positioning system is provided, including a position information acquiring module 802 and a group central position determining module 804.

The position information acquiring module 802 is configured to acquire position information corresponding to positioned user identifiers in a group, to obtain a position information set.

A group refers to a set of multiple user identifiers associated with each other by using a group identifier. A terminal corresponding to any user identifier in the group can communicate with terminals corresponding to other user identifiers in the group, thereby implementing multi-party communication. The group may be an instant messaging group, a group in a social application, a discussion group established based on an existing group, or the like, which is not limited herein.

The positioned user identifier in the group refers to a user identifier which is in the group and corresponding to a terminal of which a geographical position has been determined. The positioned user identifier includes a user identifier of which position information is reported by a terminal capable of reporting positions, and may also include a user identifier of which position information can be predicted according to position information reported by other user identifiers in the group. The position information corresponding to the user identifier refers to information representing a specific geographical position of the terminal corresponding to the user identifier on the earth, for example, the position information may be the longitude and latitude of the terminal corresponding to the user identifier. The geographical position of the terminal can reflect a geographical position of a user of the terminal, and therefore, the position information corresponding to the user identifier can reflect the geographical position of the user using the user identifier. Because the user is usually active, the user identifier may correspond to multiple pieces of position information.

The group central position determining module 804 is configured to determine a group central position according to the position information set, the number of geographical distance values that are less than or equal to a preset distance threshold among geographical distance values between the group central position and geographical positions represented by position information in the position information set being maximized.

The group central position is used for representing the geographical position of the group, and the group central position should reflect geographical positions of group members. Therefore, a reasonable group central position should be a center of geographical positions of most members in the group, and cover geographical positions of position information corresponding to as many positioned user identifiers as possible in the group.

It is assumed that positioned user identifiers in a group correspond to a total of n pieces of position information, forming a position information set, where position information of the $i^{th}$ positioned user identifier is $p_i$, $i \in \{1, 2, \ldots, n\}$. The group central position is c. r represents a confidence radius corresponding to the group central position c, namely, the preset distance threshold. In this manner, the problem of determining the group central position becomes an optimization (or sometimes referred to as mathematical programming) problem, and a target function for optimization is:

$$\max \sum_{i=1}^{n} \mathrm{sgn}(r - \mathrm{distance}(p_i, c));$$

where the function distance(,) is a function for solving a geographical distance value, representing solving a geographical distance value between geographical positions represented by two independent variables of the function distance(,). the function sgn( ) is a logic function, representing that if the variable of the function sgn( ) is greater than or equal to 0, the result of the function is 1, and if the variable of the function sgn( ) is less than 0, the result of the function is 0. the function sgn( ) is used for indicating whether the geographical distance value distance($p_i$,c) between the geographical position represented by the position information $p_i$ in the position information set and the group central position is less than or equal to the preset distance threshold r, and if yes, the result of the function sgn( ) is 1, or if not, the result of the function sgn( ) is 0; to summate result values is to count the number of geographical distance values that are less than or equal to the preset distance threshold r; max indicates that the count is maximized.

Therefore, the foregoing target function means to find a group central position c that satisfies the following condition: in a geographical distance value set formed by geographical distance values distance($p_i$,c) between the group central position c and geographical positions represented by position information $p_i$ in the position information set, the number of geographical distance values distance($p_i$,c) that are less than or equal to the preset distance threshold r is maximized.

The confidence radius or preset distance threshold is a geographical distance determined in advance, in which a probability of people carrying out activities is greater than a preset probability threshold; the preset geographical distance threshold may be 700 meters to 1500 meters, especially, the group positioning effect is optimal when the geographical distance threshold is 1000 meters. Moreover, the position information reported by the terminal generally has an error, and the error may be several hundred meters; therefore, setting the geographical distance threshold to around 1000 meters can avoid the interference of the error.

During calculation of the geographical distance value, the earth may be approximated as a normal sphere, and in this case, the geographical distance between two points can be solved by using a spherical distance formula.

$$\mathrm{distance}(p_i, p_j) = R \cdot \mathrm{arccos}\ [\cos \beta_i \cos \beta_j \cos(\alpha_i - \alpha_j) + \sin \beta_i \sin \beta_j]$$

where $p_i$, $p_j$ represent two points involved in the calculation of the geographical distance respectively; R=6318.137 (kilometers), representing the radius of the earth; $\alpha_i, \beta_i$ represent the longitude and latitude of the point $p_i$ respectively; and $\alpha_j, \beta_j$ represent the longitude and latitude of the point $p_j$ respectively.

The group central position determining module 804 is configured to calculate an optimal solution of the foregoing target function; an existing mathematical programming algorithm, such as integer programming, may be used. Specifically, a value range of the group central position may be determined according to the position information in the position information set, and then the group central position is set to every integer value in the value range, to find, in the value range, an integer value that makes $$\sum_{i=1}^{n} \mathrm{sgn}(r - \mathrm{distance}(p_i, c))$$

maximum, and the integer value is used as the finally determined group central position.

In the foregoing group positioning system, position information corresponding to positioned user identifiers in a group is acquired first to obtain a position information set, and then a group central position is determined according to the acquired position information set. In addition, the number of geographical distance values that are less than or equal to a preset distance threshold among geographical distance values between the group central position and geographical positions represented by position information in the position information set being maximized represents that the number of group members carrying out activities in a circular area that uses the group central position as the center and the preset distance threshold as the radius is maximized. The group central position determined in this manner can reflect actual geographical positions of as many members as possible in the group, and therefore, the group central position can reflect an actual geographical position of the group.

Figure 9:
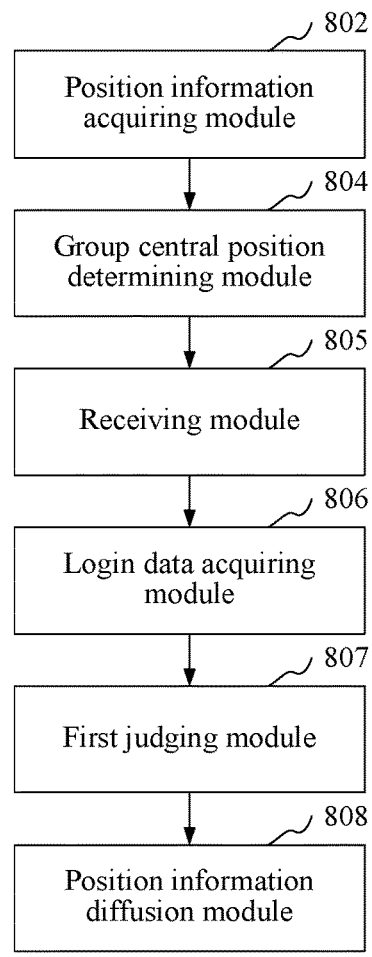
FIG. 9 is a structural block diagram of a group positioning system in still another embodiment.

As shown in FIG. 9, In an embodiment, the group positioning system further includes: a receiving module 805, a login data acquiring module 806, a first judging module 807, and a position information diffusion module 808.

The receiving module 805 is configured to receive position information and a position information reporting time reported by a terminal corresponding to a first user identifier in the group.

The first user identifier is a user identifier corresponding to a terminal that proactively reports position information, and the terminal corresponding to the first user identifier is a terminal capable of reporting positions. The terminal generally may be a mobile terminal, such as a mobile phone, a tablet computer, or a PDA. Such mobile terminal generally has a GPS module and a network connection module, and therefore, can implement real-time positioning and report position information and a position information reporting time. The position information reporting time refers to time when the terminal reports the position information.

The terminal corresponding to the first user identifier may report position information by using application clients such as an instant messaging client and an electronic map client running thereon. Specifically, the terminal corresponding to the first user identifier may report LBS information, where the LBS includes the first user identifier, the position information reporting time, and the position information. The LBS information may further include a positioning type, such as a GPS positioning type, a Cell-ID positioning type, or a WIFI (where WIFI is a technology for connection to a wireless network by using radio waves) positioning type, where the GPS positioning type is the most accurate, and the credibility of the reported position information may be judged according to the positioning type. The LSB information may further include a login network address corresponding to the first user identifier.

The login data acquiring module 806 is configured to acquire login data corresponding to each user identifier in the group, the login data including login time information and a login IP address.

The login data acquiring module 806 may be configured to acquire login data corresponding to all user identifiers in the group, and the user identifiers herein include a first user identifier and a second user identifier that is described below. Alternatively, after the first user identifier reports the LBS information including the login time information and login network address thereof, the login data acquiring module 806 may be configured to acquire only login data corresponding to user identifiers that are not the first user identifier in the group. The login time information may be used to represent a period of time when the corresponding user identifier is in a logged-in state, for example, the login time information may include a specific time point when a login action (or an action of getting online) is executed and a time point when a logout action (which is opposite to the login action, and may be referred to as an action of getting offline) is executed. The login network address is used for indicating a network location of the terminal when the terminal logs in, for example, the login network address may be an IP address.

The first judging module 807 is configured to determine, according to the login data and the position information reporting time corresponding to the first user identifier, whether the group includes such second user identifier that when the terminal corresponding to the first user identifier reports the position information, the terminal corresponding to the first user identifier and a terminal corresponding to the second user identifier are in a logged-in state in a same local area network.

Specifically, both the first user identifier and the second user identifier are user identifiers in the group, the position information reporting time of the first user identifier has a time overlap with the login time information corresponding to the second user identifier, and network positions represented by the login network address corresponding to the first user identifier and the login network address corresponding to the second user identifier indicate that the first user identifier and the second user identifier are in a same local area network.

The position information diffusion module 808 is configured to use the position information corresponding to the first user identifier as position information corresponding to the second user identifier if the group includes the second user identifier.

If the number of first user identifiers whose position information is reported is excessively small, the group position determined according to the position information of first user identifiers that only account for a small proportion in the group is inaccurate, and cannot reflect the actual geographical position of the group. Generally, terminals located in a same local area network are also geographically close to each other, and the position information diffusion module 808 may be configured to approximately regard the terminals located in the same local area network as having a same geographical position. Therefore, the position information diffusion module 808 herein is configured to use the position information reported by the terminal corresponding to the first user identifier as position information of the local area network where the terminal is located, and because the terminal corresponding to the second user identifier is also located in the local area network, the position information diffusion module 808 may be configured to use the position information of the local area network as the position information corresponding to the second user identifier. To simplify description, the position information diffusion module 808 may be configured to diffuse the position information of the first user identifier to the second user identifier. This embodiment can increase the amount of position information for determining the group central position, so that the finally determined position of the group is more accurate and can reflect the actual geographical position of the group.

The position information acquiring module 802 is further configured to acquire the position information separately corresponding to the first user identifier and the second user identifier, to obtain a position information set.

Both the first user identifier and the second user identifier are positioned user identifiers in the group, the position information acquiring module 802 is configured to acquire the position information of the first user identifier and the position information corresponding to the second user identifier, namely, acquire position information corresponding to the positioned user identifiers in the group, thereby obtaining the position information set including the acquired position information. The position information diffusion module 808 may be configured to diffuse LSB information including the position information to the second user identifier, so that the second user identifier has corresponding LBS information.

When the group does not include the second user identifier, the positioned user identifiers are the position information acquiring module 802 is configured to acquire position information corresponding to the first user identifiers, to obtain the position information set.

In this embodiment, the step of diffusing the position information is used to solve the problem that when only a small proportion of members in the group report position information by using terminals, the number of first user identifiers used as samples is excessively small, which affects the accuracy of the group position determined. Specifically, when the terminal corresponding to the first user identifier reports position information, if the group includes a second user identifier that is in a logged-in state in a same local area network in a same time period as the first user identifier, the position information reported by the terminal corresponding to the first user identifier is used as position information corresponding to the second user identifier, thereby increasing the number of positioned user identifiers in the group. Experiments show that after diffusion of the position information, the number of positioned user identifiers in the group is increased by 300% compared with the number of positioned user identifiers when the position information is not diffused. In this way, in a subsequent process of determining the group central position according to the positioned user identifier, more position information is involved, so that the finally determined group central position is more accurate and can reflect the actual geographical position of the group.

Figure 10:
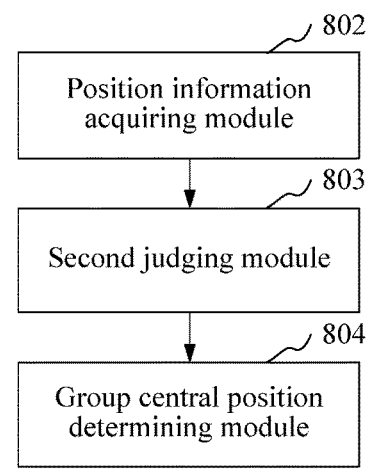
FIG. 10 is a structural block diagram of a group positioning system in an embodiment.

As shown in FIG. 10, in an embodiment, the group positioning system further includes a second judging module 803, configured to determine whether a proportion of the number of positioned user identifiers in the group to a total number of user identifiers in the group is greater than or equal to a preset proportion threshold.

The group central position determining module 804 is further configured to determine the group central position of the position information set when the proportion of the number of positioned user identifier in the group to the total number of user identifiers in the group is greater than or equal to the preset proportion threshold, where the number of geographical distance values that are less than or equal to a preset distance threshold among geographical distance values between the group central position and geographical positions represented by position information in the position information set is maximized.

It is assumed that the group includes a total of Q user identifiers, the number of positioned user identifiers is M (which, for example, may be a total number of the foregoing first user identifiers and second user identifiers), and $\xi$ is used to represent the preset proportion threshold. If $M/Q \geq \xi$, it indicates that the number of positioned user identifiers in the group is sufficient to determine the position of the group, and therefore, the group central position determining module 804 may determine the group central position according to the position information set. If $M/Q < \xi$, it indicates that the number of positioned user identifiers in the group is insufficient to accurately determine the position of the group, and therefore, group positioning is stopped. The preset proportion threshold may be set according to actual needs, and generally may be set to any value from 40% to 60%, and is preferably 50%.

In this embodiment, by determining whether the proportion of the number of positioned user identifiers in the group to the total number of user identifiers in the group is greater than or equal to the preset proportion threshold, it is determined whether the group position can be accurately determined according to the position information corresponding to the positioned user identifiers; if the group position cannot be accurately determined according to the position information corresponding to the positioned user identifiers, the method process is ended, and other methods may be used to determine the group position, to avoid that the finally determined group position has an excessive error and fails to reflect the actual geographical position of the group.

In an embodiment, the position information acquiring module 802 is further configured to collect position information corresponding to positioned user identifiers in the group in a preset time period, and determine representative position information corresponding to each positioned user identifier according to the collected position information, so as to obtain a position information set including the representative position information.

In this embodiment, the position information acquiring module 802 is first configured to collect position information corresponding to a determined user identifier in the group in a preset time period, where the preset time segment may be one to two months, so as to collect sufficient position information samples, so that the collected position information is combined to reflect an actual geographical position of a user corresponding to the user identifier. The position information acquiring module 802 may be configured to diffuse, each time position information reported by the terminal corresponding to the first user identifier is received, the position information reported each time to the second user identifier that is a logged-in state in a same period of time and in a same local area network as the first user identifier. Finally, the representative position information corresponding to each positioned user identifier is determined according to the collected position information, where the representative position information herein refers to position information determined by combining all the collected position information, so that the representative position information can reflect the actual geographical position corresponding to the user identifier.

Figure 11:
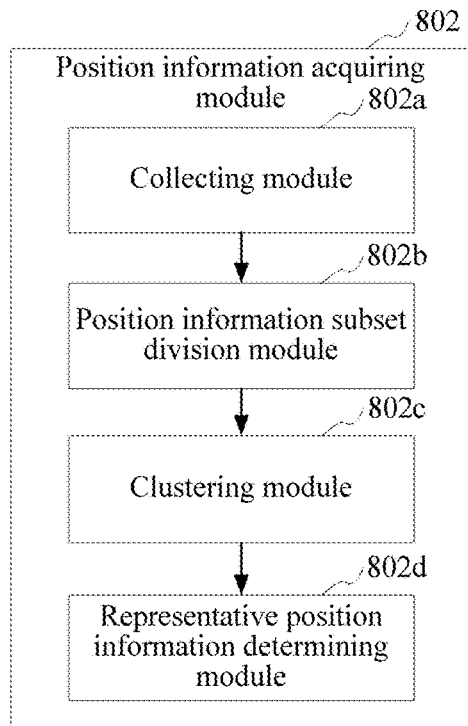
FIG. 11 is a structural block diagram of an embodiment of a position information acquiring module in FIG. 8.

As shown in FIG. 11, in an embodiment, the position information acquiring module 802 includes: a collecting module 802a, a position information subset division module 802b, a clustering module 802c, and a representative position information determining module 802d.

The collecting module 802a is configured to collect position information and position information reporting times corresponding to the positioned user identifiers in the group in the preset time period.

Position information reporting time corresponding to the first user identifier in the group may be from the LBS information reported by the terminal corresponding to the first user identifier. In the foregoing embodiment, the position information diffusion module 808 may be configured to diffuse, to the second user identifier, the position information and position information reporting time corresponding to the first user identifier, or diffuse, to the second user identifier, the LBS information including the position information and the position information reporting time, so that the second user identifier has corresponding position information and position information reporting time.

The position information subset division module 802b is configured to classify, according to the position information reporting times corresponding to the positioned user identifiers and based on preset time segments, the position information corresponding to each positioned user identifier into position information subsets corresponding to the time segments.

The time segment refers to a continuous period of time. According to some praxiology researches, most of humans carry out activities in a limited range, and most users usually appear at few places they haunt, for example, a place where the user works and a place where the user lives. Moreover, activity places of humans are closely related to time, for example, the user is generally at the work place in a working time segment from 10 am to 5 pm on a workday, and is generally at the place where the user lives in a home time segment from 8 pm to 6 am of the next day. Therefore, the position information subset division module 802b may be configured to classify, according to the two preset time segments, namely, the working time segment and home time segment, the position information corresponding to each positioned user identifier into a first position information subset corresponding to the working time segment, and a second position information subset corresponding to the home time segment.

The clustering module 802c is configured to cluster the position information in each position information subset to obtain multiple clusters.

The clustering module 802c may be configured to use multiple clustering methods, for example, a system clustering method and a dynamic clustering method, to cluster position information in each position information subset. A K-means clustering algorithm is used as an example herein for description. Because most activities of people occur in a limited number of places, in the K-means clustering algorithm herein, K is set to 5, and the clustering module 802c is configured to implement the following functions:

Input: K (K=5), where a first position information subset corresponding to a working time segment corresponding to a given user identifier is lbs [n];

(1) selecting K initial central points, for example, $c[0]=lbs[0], \ldots c[K-1]=lbs[K-1]$;

(2) comparing each value in lbs [0] . . . , lbs [n] with $c[0] \ldots, c[k-1]$, and if a value has a minimum difference with $c[i]$, marking the point as i (i=0, 1, 2, 3, 4);

(3) for all points marked as i, calculating $c[i]$ again, where $c[i]=\{sum\ of\ lbs\ [j]\ marked\ as\ i\}/the\ number\ of\ points\ marked\ as\ i$; (j is the number of values in lbs [0] . . . , lbs [n] having minimum differences with $c[i]$ in $c[0] \ldots, c[k-1]$);

(4) repeating (2) and (3), until variations of all values of $c[i]$ are less than a given threshold.

In this way, K cluster centers are obtained, and then the clustering module 802c may be configured to calculate a difference between each piece of position information in the working time subset with each cluster center, to classify each piece of position information to a class of a cluster center having a minimum difference with the position information, thereby obtaining K clusters. The K-means clustering algorithm may also be used on the position information subset corresponding to the home time segment, to obtain K clusters, and the calculation process is not described herein again.

The representative position information determining module 802d is configured to determine, according to a cluster including a largest amount of position information among the multiple clusters, representative position information corresponding to each position information subset, so as to obtain the position information set including the representative position information.

Specifically, the representative position information determining module 802d is configured to count the number of pieces of position information included in each cluster, and a cluster including a largest amount of position information indicates that the user is more probably to appear in the geographical position corresponding to this cluster; therefore, the representative position information determining module 802d may be configured to determine the representative position information corresponding to the subset according to this cluster. The representative position information determining module 802d may be configured to calculate a mean of all position information in the cluster including the largest amount of position information, or calculate a center of gravity of a set formed by all position information in the cluster including the largest amount of position information, thereby obtaining the representative position information corresponding to each position information subset.

In this embodiment, on the basis of the praxiology, position information corresponding to each positioned user identifier is classified into corresponding position information subsets according to the position information reporting times corresponding to the positioned user identifiers in the group and a preset number of time segments, and clustering is performed on each position information subset, to obtain representative position information corresponding to each position information subset. The representative position information obtained in this manner can more accurately reflect several different geographical positions that the user haunts, so that a more accurate result is obtained when the position of the group is determined according to multiple pieces of representative position information subsequently.

Figure 12:
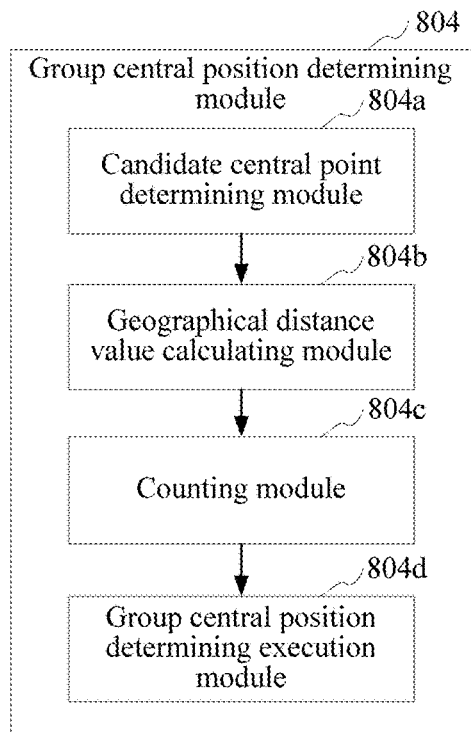
FIG. 12 is a structural block diagram of an embodiment of a group central position determining module in FIG. 8.

As shown in FIG. 12, in an embodiment, the group central position determining module 804 includes: a candidate central point determining module 804a, a geographical distance value calculating module 804b, a counting module 804c, and a group central position determining execution module 804d.

The candidate central point determining module 804a is configured to determine the candidate central point according to the position information set.

Specifically, in an embodiment, the candidate central point determining module 804a may be configured to use the geographical position represented by each piece of position information in the position information set as a candidate central point. Alternatively, in another embodiment, after cluster subsets are obtained by clustering position information in the position information set, the candidate central point determining module 804a may be configured to determine a corresponding candidate central point according to all position information in each cluster subset, for example, calculate a center of gravity or a mean of a set formed by all position information in each cluster subset.

The geographical distance value calculating module 804b is configured to separately calculate, corresponding to each candidate central point, geographical distance values between each candidate central point and geographical positions represented by position information in the position information set.

The geographical distance value calculating module 804b is configured to separately calculate, corresponding to each candidate central point, geographical distance values between the candidate central point and geographical positions represented by position information in the position information set. The geographical distance value may be calculated by using the function distance(,) in the foregoing embodiment, where the candidate central point and each piece of position information in the position information set are separately used as two independent variables of the function distance(,) to calculate the geographical distance value.

The counting module 804c is configured to count the number of geographical distance values that are less than or equal to the preset distance threshold among the geographical distance values corresponding to each candidate central point.

A series geographical distance values are calculated for each candidate central point, and then the counting module 804c is configured to count, corresponding to each candidate central point, the number of geographical distance values that are less than or equal to the preset distance threshold among the geographical distance values corresponding to the candidate central point. In this way, each candidate central point corresponds to a count.

The group central position determining execution module 804d is configured to determine the group central position according to a candidate central point corresponding to a largest count.

Specifically, because the candidate central point corresponding to the largest count can cover most user identifiers in the group, the group central position determining execution module 804d may be configured to directly use the candidate central point corresponding to the largest count as the group central position.

The group positioning system in this embodiment has advantages such as a small code amount, high operation efficiency, and low space complexity.

In an embodiment, the candidate central point determining module 804a is further configured to use the geographical position represented by each piece of position information in the position information set as a candidate central point. The geographical distance value calculating module 804b is further configured to separately calculate, corresponding to each candidate central point, geographical distance values between each candidate central point and geographical positions represented by position information that is in the position information set and not corresponding to the current candidate central point.

In this embodiment, the candidate central point determining module 804a is configured to use the geographical position represented by each piece of position information in the position information set as a candidate central point; in this case, the position information set has a piece of position information that represents a geographical position the same as the candidate central point, and therefore, for each candidate central point, the candidate central point determining module 804a may be configured to calculate geographical distance values between the candidate central point and geographical position represented by position information that is in the position information set and not corresponding to the current candidate central point. The term "current" refers to time when the geographical distance values corresponding to the candidate central point are calculated.

In an embodiment, the group central position determining execution module 804d is further configured to select a candidate central point corresponding to a largest count, and determine position information which is in the position information set and of which geographical distance values to the selected candidate central point are less than or equal to the preset distance threshold; and calculate a center of gravity of a set formed by the selected candidate central point and the determined position information, to obtain the group central position.

Specifically, after obtaining the count corresponding to each candidate center, the group central position determining execution module 804d may be configured to select a candidate central point corresponding to a largest count. Subsequently, for the selected candidate central point, the group central position determining execution module 804d is configured to determine position information which is in the position information set and represents geographical positions whose geographical distance values to the selected candidate central point are less than or equal to the preset distance threshold is determined. The counting module 804c may be configured to count the number of geographical distance values that are less than or equal to the preset distance threshold among the geographical distance values corresponding to each candidate central point.

Geographical positions represented by the selected candidate central point and the determined position information may be connected to form a polygon, and the group central position determining execution module 804d may calculate a center of gravity of the polygon formed by connecting these points and map the center of gravity to the surface of the earth that is approximated as a normal sphere, to obtain the longitude and latitude, thereby obtaining the group central position.

In this embodiment, after a candidate central point corresponding to a largest count is selected, a center of gravity of all position information in a circular area that uses the selected candidate central point as the center and the preset distance threshold as the radius is solved. Positions of all group members in the area are considered comprehensively, so that the finally obtained group central position can better reflect the actual geographical position of the group.

A person of ordinary skill in the art may understand that all or some of the processes in the foregoing embodiments may be implemented by a computer program instructing relevant hardware. The computer program may be stored in a computer readable storage medium. When being executed, the computer program may include the processes of the embodiments of the foregoing embodiments. The storage medium may be a magnetic disk, an optical disc, a read-only memory (ROM), a random access memory (RAM), or the like.

The foregoing embodiments only describe several implementation manners of the present disclosure, and their description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A group positioning method, comprising:
acquiring position information corresponding to positioned user identifiers in a group, to obtain a position information set; and
determining a group central position according to the position information set, number of geographical distance values that are less than or equal to a preset distance threshold among geographical distance values between the group central position and geographical positions represented by position information in the position information set being maximized;
wherein the acquiring position information corresponding to positioned user identifiers in the group, to obtain the position information set comprises:
collecting position information corresponding to positioned user identifiers in the group in a preset time period, and determining representative position information corresponding to each positioned user identifier according to the collected position information, so as to obtain the position information set comprising the representative position information; and before the acquiring position information corresponding to positioned user identifiers in the group, to obtain the position information set, the method further comprises:

receiving position information and a position information reporting time reported by a terminal corresponding to a first user identifier in the group;

acquiring login data corresponding to each user identifier in the group, the login data comprising login time information and a login network address;

determining, according to the login data and the position information reporting time corresponding to the first user identifier, whether the group comprises such second user identifier that when the terminal corresponding to the first user identifier reports the position information, the terminal corresponding to the first user identifier and a terminal corresponding to the second user identifier are in a logged-in state in a same local area network;

using the position information corresponding to the first user identifier as position information corresponding to the second user identifier if the group comprises the second user identifier; and the acquiring position information corresponding to positioned user identifiers in the group, to obtain the position information set comprises:

acquiring the position information separately corresponding to the first user identifier and the second user identifier, to obtain the position information set.

2. The method according to claim 1, wherein the collecting position information corresponding to positioned user identifiers in the group in the preset time period, and determining representative position information corresponding to each positioned user identifier according to the collected position information, so as to obtain the position information set comprising the representative position information comprises:

collecting position information and position information reporting times corresponding to the positioned user identifiers in the group in the preset time period;

classifying, according to the position information reporting times corresponding to the positioned user identifiers and based on preset time segments, the position information corresponding to each positioned user identifier into position information subsets corresponding to the preset time segments;

clustering the position information in each position information subset to obtain multiple clusters; and determining, according to a cluster comprising a largest amount of position information among the multiple clusters, representative position information corresponding to each position information subset, so as to obtain the position information set comprising the representative position information.

3. The method according to claim 1, after the acquiring position information corresponding to positioned user identifiers in the group, to obtain the position information set, further comprising:

determining whether a proportion of the number of the positioned user identifiers in the group to a total number of user identifiers in the group is greater than or equal to a preset proportion threshold; and executing the step of determining a group central position according to the position information set if the proportion is greater than or equal to the preset proportion threshold, the number of geographical distance values that are less than or equal to the preset distance threshold among geographical distance values between the group central position and geographical positions represented by position information in the position information set being maximized.

4. The method according to claim 1, wherein the determining a group central position according to the position information set comprises:

determining candidate central points according to the position information set;

separately calculating, corresponding to each candidate central point, geographical distance values between each candidate central point and geographical positions represented by position information in the position information set;

counting the number of geographical distance values that are less than or equal to the preset distance threshold among the geographical distance values corresponding to each candidate central point; and determining the group central position according to the candidate central point corresponding to a largest count.

5. The method according to claim 4, wherein the determining candidate central points according to the position information set comprises:

using the geographical position represented by each piece of position information in the position information set as the candidate central point;

the separately calculating, corresponding to each candidate central point, geographical distance values between each candidate central point and geographical positions represented by position information in the position information set comprises:

separately calculating, corresponding to each candidate central point, geographical distance values between each candidate central point and geographical positions represented by position information that is in the position information set and not corresponding to the current candidate central point.

6. The method according to claim 4, wherein the determining the group central position according to a candidate central point corresponding to a largest count comprises:

selecting the candidate central point corresponding to the largest count, and determining position information which is in the position information set and of which geographical distance values to the selected candidate central point are less than or equal to the preset distance threshold; and calculating a center of gravity of a set formed by the selected candidate central point and the determined position information, to obtain the group central position.

7. A group positioning system, comprising:

a position information acquiring module, configured to acquire position information corresponding to positioned user identifiers in a group, to obtain a position information set; and a group central position determining module, configured to determine a group central position according to the position information set, number of geographical distance values that are less than or equal to a preset distance threshold among geographical distance values between the group central position and geographical positions represented by position information in the position information set being maximized;

wherein the position information acquiring module is configured to collect position information corresponding to positioned user identifiers in the group in a preset time period, and determine representative position information corresponding to each positioned user identifier according to the collected position information, so as to obtain the position information set comprising the representative position information, and the system further comprises: a receiving module, a login data acquiring module, a first judging module, and a position information diffusion module, wherein the receiving module is configured to receive position information and a position information reporting time reported by a terminal corresponding to a first user identifier in the group;

the login data acquiring module is configured to acquire login data corresponding to each user identifier in the group, the login data comprising login time information and a login network address;

the first judging module is configured to determine, according to the login data and the position information reporting time corresponding to the first user identifier, whether the group comprises such second user identifier that when the terminal corresponding to the first user identifier reports the position information, the terminal corresponding to the first user identifier and a terminal corresponding to the second user identifier are in a logged-in state in a same local area network;

the position information diffusion module is configured to use the position information corresponding to the first user identifier as position information corresponding to the second user identifier if the group comprises the second user identifier; and the position information acquiring module is further configured to acquire the position information separately corresponding to the first user identifier and the second user identifier, to obtain the position information set.

8. The system according to claim 7, wherein the position information acquiring module comprises:

a collecting module, configured to collect position information and position information reporting times corresponding to the positioned user identifiers in the group in the preset time period;

a position information subset division module, configured to classify, according to the position information reporting times corresponding to the positioned user identifiers and based on preset time segments, the position information corresponding to each positioned user identifier into position information subsets corresponding to the preset time segments;

a clustering module, configured to cluster the position information in each position information subset to obtain multiple clusters; and a representative position information determining module, configured to determine, according to a cluster comprising a largest amount of position information among the multiple clusters, representative position information corresponding to each position information subset, so as to obtain the position information set comprising the representative position information.

9. The system according to claim 7, further comprising a second judging module, configured to determine whether a proportion of the number of the positioned user identifiers in the group to a total number of user identifiers in the group is greater than or equal to a preset proportion threshold; and the group central position determining module is further configured to determine the group central position according to the position information set when the proportion of the number of the positioned user identifiers in the group to the total number of user identifiers in the group is greater than or equal to the preset proportion threshold.

10. The system according to claim 7, wherein the group central position determining module comprises:

a candidate central point determining module, configured to determine candidate central points according to the position information set;

a geographical distance value calculating module, configured to separately calculate, corresponding to each candidate central point, geographical distance values between each candidate central point and geographical positions represented by position information in the position information set;

a counting module, configured to count the number of geographical distance values that are less than or equal to the preset distance threshold among the geographical distance values corresponding to each candidate central point; and a group central position determining execution module, configured to determine the group central position according to a candidate central point corresponding to a largest count.

11. The system according to claim 10, wherein the candidate central point determining module is further configured to use the geographical position represented by each piece of position information in the position information set as the candidate central point; and the geographical distance value calculating module is further configured to separately calculate, corresponding to each candidate central point, geographical distance values between each candidate central point and geographical positions represented by position information that is in the position information set and not corresponding to the current candidate central point.

12. The system according to claim 10, wherein the group central position determining execution module is further configured to select the candidate central point corresponding to the largest count, and determine position information which is in the position information set and of which geographical distance values to the selected candidate central point are less than or equal to the preset distance threshold; and calculate a center of gravity of a set formed by the selected candidate central point and the determined position information, to obtain the group central position.

* * * * *